United States Patent

Jones

(10) Patent No.: US 6,673,266 B2
(45) Date of Patent: Jan. 6, 2004

(54) FIRE-RETARDANT PETROLEUM COMPOSITION

(75) Inventor: William H. Jones, State College, PA (US)

(73) Assignee: NiPoNi, LLC, State College, PA (US)

( * ) Notice: Subject to any disclaimer, the term of this patent is extended or adjusted under 35 U.S.C. 154(b) by 0 days.

(21) Appl. No.: 10/331,562

(22) Filed: Dec. 30, 2002

(65) Prior Publication Data

US 2003/0091747 A1 May 15, 2003

Related U.S. Application Data

(63) Continuation of application No. 09/702,777, filed on Nov. 1, 2000, now Pat. No. 6,524,653.

(51) Int. Cl.$^7$ .................. C09K 21/00; C09K 21/12; C09K 21/14; C09D 5/18; B05D 3/02
(52) U.S. Cl. .................. 252/183.13; 252/183.11; 252/182.34; 252/609; 252/607; 252/610; 106/18.14; 106/18.17; 427/385.5; 427/393.3; 427/393.5; 427/384
(58) Field of Search .................. 252/183.13, 183.11, 252/182.34, 601, 607, 608, 609, 610; 106/18.14, 18.17; 427/384, 385.5, 393.3, 393.5

(56) References Cited

U.S. PATENT DOCUMENTS

| | | | |
|---|---|---|---|
| 2,784,159 A | 3/1957 | Fluck et al. | |
| 3,249,534 A | 5/1966 | Ware | |
| 3,436,250 A | 4/1969 | Yamaguchi et al. | |
| 3,944,688 A | 3/1976 | Inman | |
| 3,977,826 A | 8/1976 | Iscowitz | |
| 4,063,883 A | 12/1977 | Hüpfl et al. | |
| 4,066,578 A | 1/1978 | Murch et al. | |
| 4,076,547 A * | 2/1978 | Lester et al. | 106/779 |
| 4,080,160 A * | 3/1978 | Cermak et al. | 8/496 |
| 4,212,675 A * | 7/1980 | Robinson | 106/18.15 |
| 4,333,484 A * | 6/1982 | Keritsis | 131/359 |
| 4,366,070 A | 12/1982 | Block | |
| 4,389,319 A | 6/1983 | Block | |
| 4,444,831 A | 4/1984 | Leitner | |
| 4,487,800 A | 12/1984 | Nachbur et al. | |
| 4,971,728 A | 11/1990 | Vandersall | |
| 5,100,932 A | 3/1992 | Lockhart et al. | |
| 5,151,127 A | 9/1992 | Thompson | |
| 5,268,466 A * | 12/1993 | Burdick | 536/114 |
| 5,521,234 A * | 5/1996 | Brown et al. | 524/44 |
| 5,534,301 A | 7/1996 | Shutt | |
| 5,536,369 A | 7/1996 | Norlander | |
| 5,753,316 A * | 5/1998 | Brent et al. | 427/486 |
| 5,795,522 A | 8/1998 | Firgo et al. | |
| 5,861,456 A * | 1/1999 | Berte' et al. | 524/556 |
| 5,922,420 A | 7/1999 | Dahlin et al. | |
| 5,948,148 A | 9/1999 | Cuevas | |
| 6,025,311 A * | 2/2000 | Clarke et al. | 510/121 |
| 6,042,639 A | 3/2000 | Valsö et al. | |
| 6,120,562 A | 9/2000 | Patsch et al. | |
| 6,482,875 B2 * | 11/2002 | Lorenz et al. | 524/11 |

FOREIGN PATENT DOCUMENTS

| | | |
|---|---|---|
| EP | 00252649 B1 | 9/1992 |
| EP | 00390281 B1 | 12/1992 |
| EP | 00440472 B1 | 8/1995 |
| EP | 00777558 B1 | 1/2000 |
| EP | 00783601 B1 | 5/2000 |
| WO | WO98/50617 * | 11/1998 |

OTHER PUBLICATIONS

Lewin et al., "Technology and Test Methods of Flameproofing of Cellulosics", *Flame–Retardant Polymer Materials*, 1975, pp. 19–74.

Tasker, S. et al., "Influence of cross–linking upon the macroscopic pore structure of cellulose," *Journal of Physical Chemistry*, Aug. 4, 1994, pp. 7599–7601, vol. 98, No. 31 (abstract).

* cited by examiner

*Primary Examiner*—Joseph D. Anthony
(74) *Attorney, Agent, or Firm*—Hollander Law Firm, P.L.C.

(57) ABSTRACT

A cellulose-based fire retardant composition is made by (1) adding cellulose to water, thereby forming a solution; (2) adding liquid ammonia to the solution; and (3) subsequently adding solid diammonium phosphate to the solution, thereby forming a viscous cellulose-based fire retardant liquid.

12 Claims, No Drawings

FIRE-RETARDANT PETROLEUM COMPOSITION

This application is a Continuation of U.S. application Ser. No. 09/702,777, filed Nov. 1, 2000 now U.S. Pat. No. 6,524,653. The entire disclosure of prior application Ser. No. 09/702,777, filed Nov. 1, 2000, is considered to be part of the disclosure of this application and is hereby incorporated by reference herein in its entirety.

BACKGROUND OF THE INVENTION

The present invention is directed to a cellulose-based fire retardant composition and to methods of making and using such fire retardant compositions.

Cellulose and cellulosic products are considered flammable because they are readily ignited and are rapidly consumed after ignition. When cellulose is heated to the decomposition temperature, it yields volatile, flammable gases, as well as liquid and tarry products that may also volatize and ignite, leaving a char consisting mainly of carbon. The slow oxidation of this char is responsible for the afterglow.

By definition, a flame-resistant material does not support combustion and does not glow after removal of an ignition source. A fire retardant is a coating or integrated chemical that causes another material to become flame resistant. To be truly effective, a fire retardant should be a non-toxic polymer that is water-soluble prior to curing and insoluble after curing. The retardant should be non-corrosive and should not emit toxic fumes when charring.

The idea of imparting flame resistance to cellulose is well known in the art. M. Lewin and S. Sell, *Technology and Test Methods of Flame Proofing of Cellulosics, Flame-Retardant Polymer Materials,* 19–136 (1975), the entirety of which is incorporated by reference herein. For practical reasons, it is important that any flame-resistant effect be durable under all conditions encountered by cellulosic material. For example, textiles must withstand not only water, but also repeated launderings and dry cleanings.

Since the question of permanence of any fire-retardant treatment is important. There are three classes of flame-resistant compositions: (1) non-durable flame retardants that are easily removed by water, rain, or perspiration; (2) semi-durable treatments that resist leaching, but lose their effectiveness after a limited number of launderings; and (3) durable flame-retardant finishes that withstand leaching, laundering and dry-cleaning.

In the past, interest has been focused upon water-soluble chemicals as non-durable flame-retarding agents. However, such agents can only impart temporary protection, since the effect of the treatment is destroyed not only by laundering, but also by rain and perspiration. Periodic reprocessing is thus necessary to maintain flame-retardancy. Because organic materials are commonly considered flammable, mostly inorganic salts and acids have been suggested as flame retardants. Very few inorganic compounds, such as ammonium salts of phosphoric acid, are able to suppress both flame propagation and afterglow. Ammonium phosphate and diammonium phosphate are the most widely used non-durable flame retardants. These salts decompose into ammonia and phosphoric acid on heating. Cellulosic materials treated with water-soluble inorganic salts must be dried carefully, since fast drying might cause crystallization of the chemicals on the surface.

Cellulosic materials may also be treated with semi-durable flame retardants that are required to withstand not only leaching in water, but also a limited number of launderings. The most obvious means of obtaining semi-durable flame resistance is the application of insoluble salts. However, water-insoluble inorganic salts generally do not easily decompose on heating. Thus, the flame-retarding effectiveness of semi-durable compositions are limited to insoluble salts of amphoteric cations or anions, for example, the phosphates or borates of tin, zinc, and aluminum. Easily-reducible metal oxides are also capable of catalytically altering the course of the thermal decomposition of cellulose and combine water-insolubility with flame-retarding properties. Such compounds are, for example, stannic, ferric, titanic, chromic, zinc, cerium, bismuth, tungsten, arsenic, and silicon oxide.

Phosphoric acid and the ammonium salts of phosphoric acid are very effective in inhibiting the combustion of cellulose. Because the protection afforded by the deposition of acid is temporary, attempts have been made to bind these compounds directly to cellulose to obtain a durable fire retardant. The heat curing of cellulose with an acidic substance in the presence of a buffering agent and a swelling medium is a suitable condition for cellulose esterification. The heat treatment of cellulose with phosphoric acid in the presence of certain nitrogen compounds thus leads to the formation of cellulose phosphate with flame-resistant properties. In practice, the cellulose is impregnated with the aqueous solution of the acid and the nitrogenous compound. After drying, the cellulose is cured at an elevated temperature.

Various other flame or fire retardant compositions are disclosed below. All of the patents are incorporated by reference herein.

U.S. Pat. No. 2,784,159 discloses flame retardant compositions containing a mixture of (1) a water-soluble salt of an oxygen-containing acid of pentavalent phosphorous; (2) a water-soluble polyalkylene polyamine; (3) a water-soluble nitrogen compound; and (4) a softening and wetting agent.

U.S. Pat. No. 3,436,250 discloses a method in which flame and soil resistance of fabrics are retained without yellowing or lowering the strength of the fabrics by treating fabrics containing cellulose or protein fibers with an aqueous solution of a composition consisting of a condensed phosphoric acid and a tertiary amine or quaternary ammonium compound.

U.S. Pat. No. 4,971,728 discloses an aqueous concentrate adapted to be diluted with water and used in fire control. The concentrate contains at least about 24% by weight of certain fire retardants, particularly diammonium phosphate; diammonium sulfate; a blend of diammonium phosphate and diammonium sulfate; a blend of monoammonium phosphate and diammonium phosphate having a nitrogen to phosphorous ratio of at least about 1.25; and a blend of monoammonium phosphate, diammonium sulfate and diammonium phosphate having a nitrogen to phosphorus ratio of at least about 1.25.

U.S. Pat. No. 5,151,127 discloses fire retardation and wood preservation compositions having inorganic salts encapsulated by a water-based acrylic resin solution. The salts are carried by water into the wood or cellulose product to be treated. After the water evaporates, the inorganic salts are retained in the treated wood and not leached from or washed out of the wood product.

U.S. Pat. No. 5,948,148 discloses a process and product for increasing the flame resistance and thermal insulation properties of chemically treated substances. A number of embodiments of flame resistant compositions are disclosed, but all embodiments include a mixture containing water, inorganic acids, ammonium salts, sodium carbonate and pyrophosphate.

U.S. Pat. No. 6,042,639 discloses fire-retarding and smoke-inhibiting aqueous compositions and a method for a one-step impregnation of aqueous-absorbable and normally inflammable materials, such as wood, paper, and textiles. The composition comprises ammonium phosphates, phosphoric acid, water-soluble metal salts with ability to form water-insoluble salts with phosphate ions and/or ammonium phosphate ions.

In addition, efforts have been made to encapsulate cellulose molecules. However, there has not been any success in fire retarding a cellulose molecule. Thus, there continues to be a need for a cellulose-based fire retardant that is insoluble in water, has an acceptable shelf-life, is non-toxic and is environmentally safe.

SUMMARY OF INVENTION

According to the present invention, a cellulose molecule is treated to give the molecule fire retardant properties. The treated cellulose has a stable shelf-life (i.e., little deterioration of flame resistant properties), is essentially non-toxic when charred, and has sufficient adhesiveness and malleability. The cellulose-based fire retardant composition can be used in wood and paper products, furniture, building materials, water-based paints, fertilizers, particle board, insulation, plywood, cement, sheet rock, carpets, linen, clothing, and the like. The fire-resistant cellulose molecule is thermally stable and has been shown not to ignite to about 3500° F.

DETAILED DESCRIPTION OF INVENTION

A cellulose-based fire retardant composition according to the present invention contains cellulose and can be made with or without water.

According to a first embodiment of the present invention, a saturated solution containing a water-soluble cellulose having a hydroxyl moiety is prepared by mixing cellulose powder and water. In embodiments about 4.8 grams of cellulose powder is added to about 300 ml of water. The water may be pre-heated or may be heated while adding the cellulose powder, for example, to 60–70° C. Although heating is not necessary, it aids in increasing the solubility of the cellulose powder in the water.

The cellulose may be hydroxy ethyl cellulose, hydroxy propyl cellulose, hydroxy isopropyl cellulose, and/or combinations thereof. In addition, cellulose having hydroxy butyl groups, hydroxy pentyl groups and/or longer carbonyl groups may have significant fire retardant properties and are considered as likely chemical structures to be used in the present invention.

Liquid ammonia ($NH_4OH$) is added to the solution and the solution is mixed. After mixing, solid diammonium phosphate (i.e., $(NH_4)_2HPO_4$) is added to the solution. In other embodiments, the diammonium phosphate can be pre-mixed in an aqueous solution prior to adding to the cellulose solution. The liquid ammonia can be in various concentrations, but is in proportion to the concentration of the cellulose material. Again, the solution may be heated during the addition, for example, to about 90° C. for about 10–15 minutes. A thick, viscous cellulose-based fire retardant composition is formed.

In other embodiments of the present invention, polyphosphates (for example, guanidine or melamine phosphates) or other diammonium salts such as diammonium sulfate, diammonium chromate, or diammonium borate can be used as an alternative, or in addition, to diammonium phosphate.

It is believed that the reaction mechanism is as follows. The ammonium hydroxide bonds to the cellulose molecule. The diammonium phosphate replaces the ammonium hydroxide groups on the cellulose molecule; binds to the cellulose molecule; and crosslinks with the cellulose molecule or another cellulose molecule thereby forming a thick, viscous cellulose-based fire retardant composition. It is believed that the ammonium hydroxide acts as a catalyst for binding the diammonium phosphate and may be recycled.

The reaction may be shown schematically as follows, wherein C is a cellulose polymer of varying molecular chain lengths and R is a molecular radical having a hydroxy group (e.g., ethyl, propyl, butyl):

1. C—R—OH (cellulose with hydroxyl group)
2. C—R—O—$NH_3$ (addition of ammonium hydroxide)
3. C—R—O—$NH_2$—$PO_4$—$NH_2O$—R—C+$NH_3$ (addition of diammonium phosphate; replacement of the $NH_3$ group with ammonia being released as vapor; and crosslinking).

The fire-retardant cellulose polymer, in its solid form, has a varying solubility in water that is related to its molecular length and the degree of crosslinking. The degree of crosslinking and average molecular chain length may be varied by the temperature used in the reaction process. In an embodiment according to the present invention, the temperature of the cellulosic solution is increased to about 100° C. so that the solution begins to boil. As the temperature of the solution is increased, the chain length shortens.

In another embodiment of the present invention, which does not require water, a water-soluble cellulose having a hydroxyl moiety is added to liquid aqueous ammonia ($NH_4OH$) solution at approximately room temperature. As mentioned above, heating can be used to speed the solubility of the cellulose but is not required. The resulting solution is stirred, resulting in a solution that is more viscous than the solution obtained according to the first embodiment of the present invention. Diammonium phosphate is then added to the viscous solution.

The viscous solution may be used as a coating. Because the fire-retardant solution has adhesive properties, it may be applied to a substrate including, but not limited to, glass, metal, wood, paper, cloth, and the like. The coated substrate is then dried, resulting in a fire-retardant coating.

In other embodiments, the viscous fire-retardant liquid may be directly added to systems such as wood, thread, carpet, mortar, and latex slurries without discoloring any of the systems to which it is added. The systems are processed to obtain fire-retardant products. When the fire-retardant product is subjected to an ignition source, the cellulose chars but does not combust. The crosslinked ammonia groups do not appear to allow oxygen to ignite the cellulose molecule. In addition, vapor is also generated when the cellulose product is contacted with an ignition source. It is postulated that the cross-linking between the diammonium phosphate and cellulose traps water within the cellulose polymer.

The present invention can also be used to fire retard petroleum molecules in a similar manner. Petroleum polymers having a hydroxyl group and in an aqueous solution, such as polystyrene, polyethylene, propylene, acrylic polymers, polyurethanes, and the like may be treated with liquid ammonium and diammonium phosphate, polyphosphates, or diammonium salts, as described above.

EXAMPLES

Example 1

About 19.2 grams of hydroxy ethyl cellulose powder was added to about 1,200 ml water, resulting in a solution containing about 10% hydroxy ethyl cellulose. The solution was then heated to about 60–70° C. Approximately 320 ml of liquid ammonia was mixed into the solution. Approximately 32 grams of solid diammonium phosphate was then added to the solution. The temperature of the solution is increased to approximately 90° C. for about 10–15 minutes, resulting in a thick, viscous liquid.

Example 2

About 4.8 g of hydroxy ethyl cellulose powder was added to about 80 ml of liquid ammonia at approximately room temperature. The resulting solution was stirred for about 30–45 minutes. Eight grams of diammonium phosphate was then added and stirred into the solution until a clear solution was obtained. The solution was allowed to crosslink for about 24 hours, resulting in a more viscous solution than that obtained according to Example 1.

Example 3

About 4.8 g of hydroxy ethyl cellulose powder was added to about 80 ml of liquid ammonia at approximately room temperature. The solution was then heated to about 60–70° C. and was stirred for about 30–45 minutes. Eight grams of diammonium phosphate was then added and stirred into the solution until a clear solution was obtained. The temperature of the solution was increased to about 60–70° C. and then to approximately 90° C. for about 10–15 minutes. The solution crosslinked, resulting in a viscous solution.

Example 4

Tissue paper was dipped in the solution obtained according to Example 1 and allowed to dry in ambient air, in a microwave, or by using a hair dryer.

The treated tissue paper was then contacted with a flame from a match, a butane lighter, or a propane torch. The tissue paper charred, but did not combust.

Example 5

Cardboard was coated with a solution obtained according to Example 1 and allowed to dry in ambient air, in a microwave, or by using a hair dryer.

The treated cardboard was then contacted with a flame from a match, a butane lighter, or a propane torch. The cardboard charred, but did not combust.

Example 6

A linen sheet was dipped in the solution obtained according to Example 1 and allowed to dry in a clothes dryer.

The dried treated sheet was then contacted with a flame from a match, a butane lighter, or a propane torch. The sheet charred, but did not combust.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of preparing a fire-retardant petroleum composition, comprising:
   adding a petroleum polymer having a hydroxyl group to water, thereby forming a solution;
   adding ammonium hydroxide to the solution;
   subsequently adding at least one diammonium salt to the solution and binding a diammonium group to the petroleum polymer; and
   crosslinking the petroleum polymer, thereby forming a fire-retardant petroleum composition.

2. A method according to claim 1, further comprising heating the water prior to adding the petroleum polymer.

3. A method according to claim 1, further comprising heating the solution after at least one of adding the petroleum polymer, adding the ammonium hydroxide, or adding the diammonium salt.

4. A method according to claim 1, wherein the diammonium salt is selected from the group consisting of diammonium phosphate, diammonium sulfate, diammonium chromate, diammonium borate, and combinations thereof.

5. A method according to claim 1, wherein the diammonium salt is selected from the group consisting of diammonium sulfate, diammonium chromate, diammonium borate, and combinations thereof.

6. A method according to claim 1, wherein said petroleum polymer is selected from the group consisting of polystyrene, polyethylene, polypropylene, acrylic polymers, polyurethanes, and combinations thereof.

7. A method according to claim 1, wherein said petroleum polymer is polyethylene or polypropylene.

8. A method of preparing a fire-retardant petroleum composition, comprising:
   adding a petroleum polymer having a hydroxyl group to water, thereby forming a solution;
   adding ammonium hydroxide to the solution; and
   subsequently adding diammonium phosphate to the solution and binding diammonium phosphate groups to the petroleum polymer; and
   crosslinking the petroleum polymer, thereby forming a fire-retardant petroleum composition.

9. A method according to claim 8, wherein said petroleum polymer is selected from the group consisting of polystyrene, polyethylene, polypropylene, acrylic polymers, polyurethanes, and combinations thereof.

10. A method according to claim 8, further comprising heating the ammonium hydroxide containing solution.

11. A method of preparing a fire-retardant petroleum composition, comprising:
    adding a petroleum polymer having a hydroxy group to water, thereby forming a solution;
    adding ammonium hydroxide to the solution;
    subsequently adding a polyphosphate having a diammonium group to the solution and binding the polyphosphate to the petroleum polymer; and
    crosslinking the petroleum polymer, thereby forming a fire-retardant petroleum composition.

12. A method according to claim 11, wherein the polyphosphate is guanidine phosphate or melamine phosphate.

* * * * *